United States Patent
Cho

(10) Patent No.: US 7,110,149 B2
(45) Date of Patent: Sep. 19, 2006

(54) CARRIAGE MODULE FOR SCANNER

(75) Inventor: Chin-Fu Cho, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 881 days.

(21) Appl. No.: 10/028,680

(22) Filed: Dec. 28, 2001

(65) Prior Publication Data

US 2003/0123102 A1  Jul. 3, 2003

(51) Int. Cl.
*H04N 1/04* (2006.01)

(52) U.S. Cl. .................. 358/474; 358/505; 358/497; 358/483; 399/347

(58) Field of Classification Search ............ 358/474, 358/505, 497, 483, 482, 513
See application file for complete search history.

(56) References Cited

U.S. PATENT DOCUMENTS 6,624,914 B1 * 9/2003 Hendrix et al. ............ 358/484
6,831,759 B1 * 12/2004 Witte et al. ................ 358/474

* cited by examiner

*Primary Examiner*—Douglas Q. Tran
*Assistant Examiner*—Negussie Worku
(74) *Attorney, Agent, or Firm*—Rosenberg, Klein & Lee

(57) ABSTRACT

A carriage module for scanner comprises a case, an image sensor, a mirror set and a lens set. The image sensor, the mirror set and the lens set are arranged in the case and used to guide a reflected light from a document to be scanned as well as convert the reflected light to an electrical counterpart. The case composed of a first shell and a second shell with a larger length than that of the first shell. The second shell is movably arranged in the first shell and can be moved along a horizontal direction.

9 Claims, 2 Drawing Sheets

CARRIAGE MODULE FOR SCANNER

FIELD OF THE INVENTION

The present invention relates to a carriage module for scanner, especially to a carriage module for scanner to reduce the size of the scanner without reducing focus length of the scanner.

BACKGROUND OF THE INVENTION

The scanners are widely used for converting paper document to computer-accessible data. The carriage module is the essential component of the scanner and under extensive research.

However, the current scanner generally uses lens with lager focus length to provide fast scanning operation. Therefore, the scanner and carriage module using fixed mounting unit generally have bulk size.

SUMMARY OF THE INVENTION

It is an object of the present invention to provide a carriage module for scanner to reduce the size of the scanner without reducing focus length of the scanner. The carriage module comprises a case composed of two shells, wherein one shell is movably arranged on the other shell and can be telescoped into the other shell, whereby the overall size of the carriage module can be reduced.

To achieve above object, the present invention provides a carriage module for a scanner, which comprises a case, an image sensor, a mirror set and a lens set. The image sensor, the mirror set and the lens set are arranged in the case. Moreover, the mirror set is used to guide a reflected light from a document to be scanned to the image sensor. The lens set is used to focus the reflected light from the document to the image sensor. The image sensor is used to convert the reflected light to an electrical counterpart. The case composed of a first shell and a second shell with a larger length than that of the first shell. The second shell is movably arranged in the first shell and can be moved along a horizontal direction. Therefore, the second shell can be advantageously telescoped into the first shell to achieve above object.

The various objects and advantages of the present invention will be more readily understood from the following detailed description when read in conjunction with the appended drawing, in which:

DETAILED DESCRIPTION OF THE INVENTION

Figure 1:
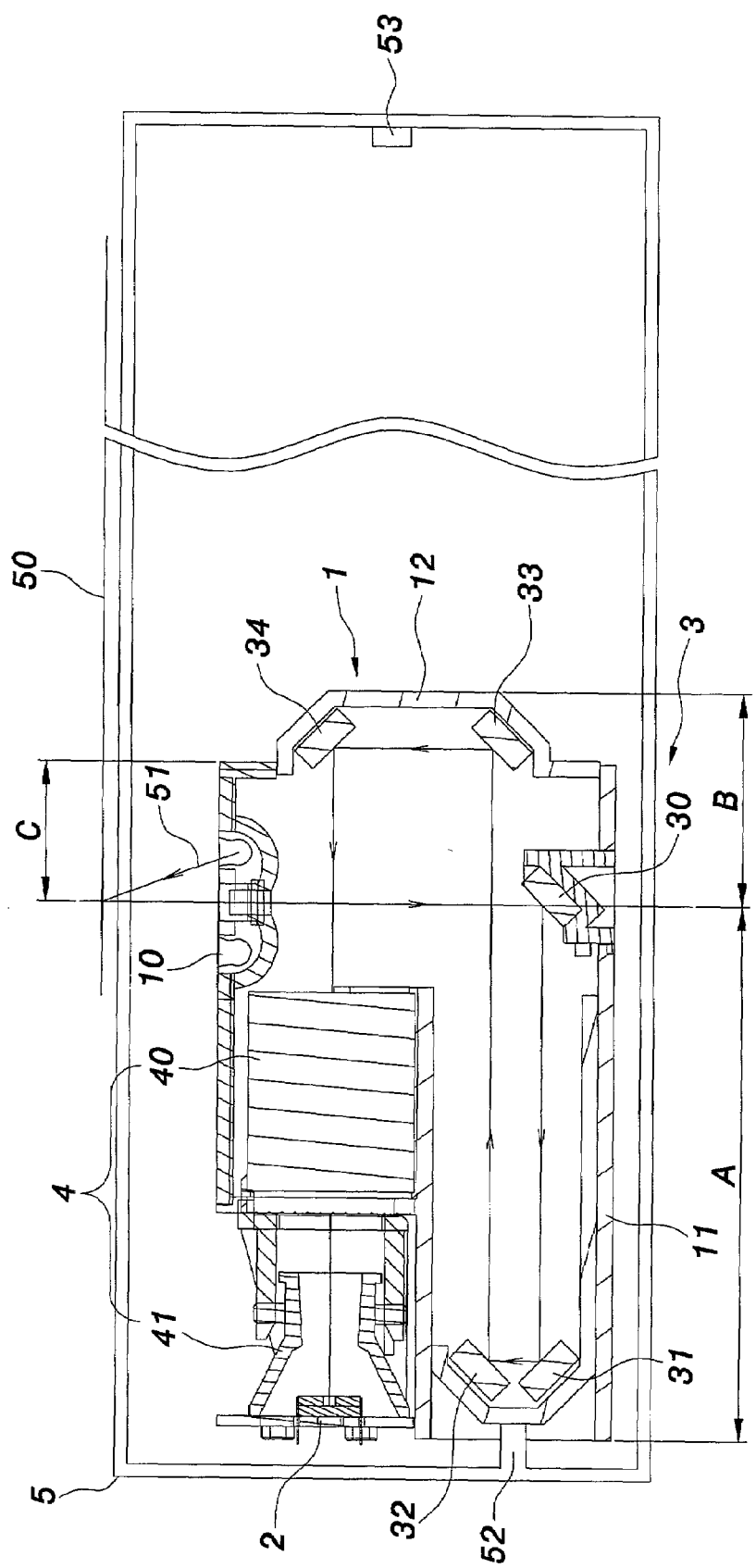
FIG. 1 shows the sectional view of the inventive carriage module for scanner in a first scanning position.
Figure 2:
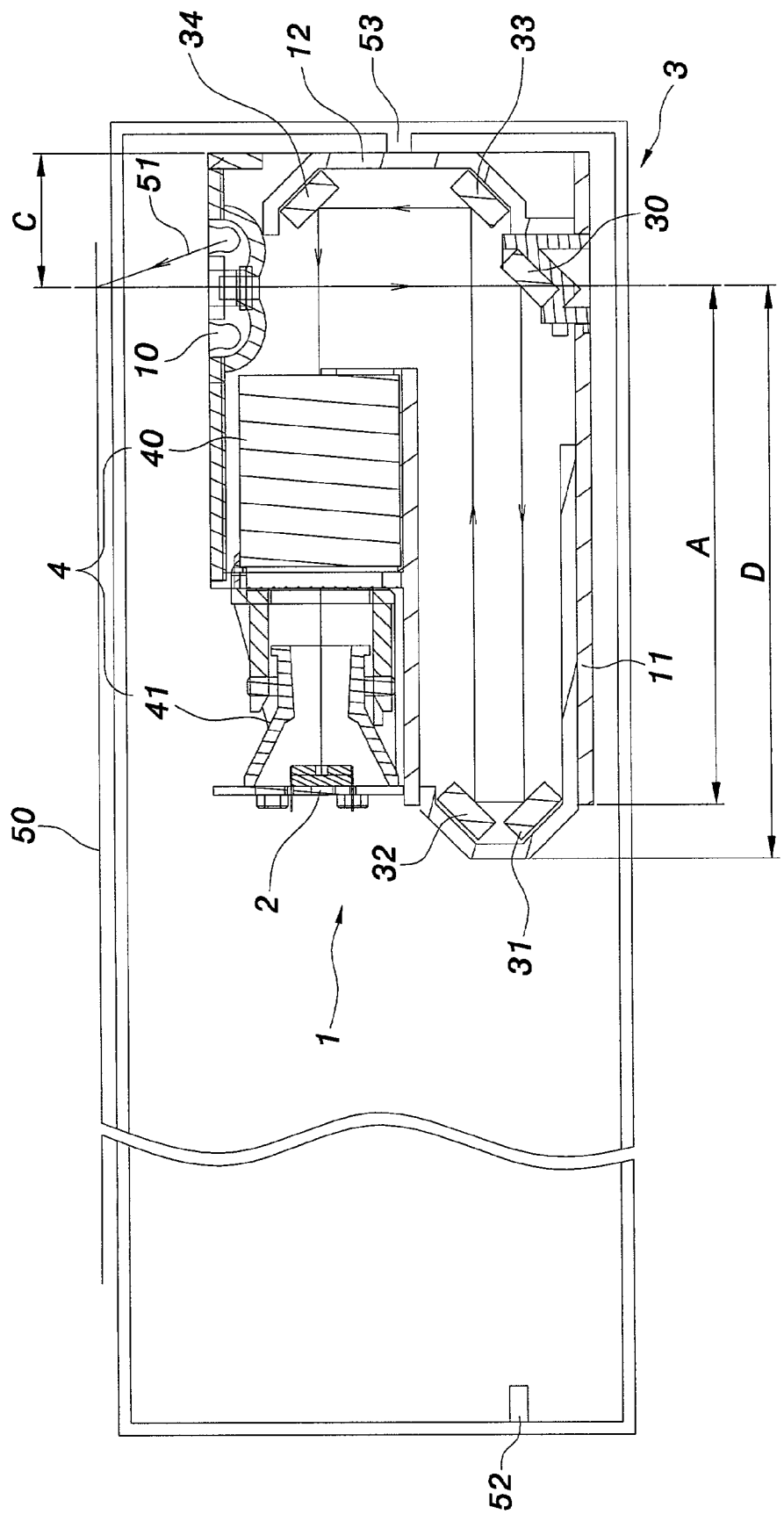
FIG. 2 shows the sectional view of the inventive carriage module for scanner in a second scanning position.

FIGS. 1 and 2 show the sectional view of the inventive carriage module for scanner in a first scanning position and a second scanning position, respectively. The inventive carriage module for scanner comprises a case 1, an image sensor 2, a mirror set 3 and a lens set 4.

The case 1 forms an outer structure of the inventive carriage module and is placed within an outer casing 5. The case 1 includes a first shell 11 and a second shell 12. Upon receiving a scanning command, the case 1 is moved from a first scanning position within the outer casing 5 as shown in FIG. 1 to a second scanning position within the outer casing 5 as shown in FIG. 2, whereby the carriage module scans a document 50 on the outer casing 5. Moreover, a light source 10 is placed atop the case 1 to provide illuminating light for the document 50.

The image sensor 2, for example, is a charge coupled device (CCD) and is functioned to convert a reflected light 51 from the document 50 to an electrical counterpart (signal). The image sensor 2 is placed within the first shell 11.

The mirror set 3 comprises a first reflection mirror 30, a second reflection mirror 31, a third reflection mirror 32, a fourth reflection mirror 33 and a fifth reflection mirror 34, and is placed within the second shell 12. The mirror set 3 is functioned to guide the reflected light from the document 50 to the image sensor 2.

The lens set 4 comprises a lens 40 and a focusing unit 41. The lens 40 is placed between the image sensor 2 and the mirror set 3 and used to focus the reflected light from the document 50 to the image sensor 2. The focusing unit 41 is used to refocus the reflected light. The distance of the reflected light 51 propagating from the document 50 and through the first reflection mirror 30, the second reflection mirror 31, the third reflection mirror 32, the fourth reflection mirror 33 and the fifth reflection mirror 34 and to the lens 40 is defined as optical path of the carriage module.

In the present invention, the case 1 is composed of a first shell 11 and a second shell 12. The case 1 is characterized in that the second shell 12 is movably arranged in the first shell 11 and can be moved along horizontal direction. The second shell 12 has a larger horizontal length (A+B or C+D) than that of the first shell 11 (A+C).

As shown in FIG. 1, when the case 1 is placed at the first scanning position, the left side of the second shell 12 abuts to the left inner wall of the outer casing 5 or to a stopper 52 on the left inner wall of the outer casing 5. At this time, the left side of the second shell 12 is telescoped into the left side of the first shell 11 and the right side of the second shell 12 is projected out of the right side of the first shell 11. Upon receiving a scanning command, the case 1 is moved from the left side of the outer casing 5 to the right side of the outer casing 5 as shown in FIG. 2 to scan the document 50.

As shown in FIG. 2, when the case 1 is moved to the second scanning position within the outer casing 5, the right side of the second shell 12 abuts to the right inner wall of the outer casing 5 or to a stopper 53 on the right inner wall of the outer casing 5. At this time, the right side of the second shell 12 is telescoped into the right side of the first shell 11 and the left side of the second shell 12 is projected out of the left side of the first shell 11. Moreover, the scanning of the document 50 is completed then.

More particularly, the second shell 12 can be telescoped into the right side or the left side of the first shell 11 during scanning operation. Therefore, the occupying space of the case 1 during scanning operation can be reduced by moving horizontally the second shell 12 while the focus length is not sacrificed.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A carriage module for a scanner, comprising
a case moving horizontally in an outer casing between a first and a second scanning positions, said case including a first shell and a second shell telescopically coupled each to the other, said first shell having first walls extending between first and second edges of said first shell, and said second shell having second walls extending between a front and a rear portions of said second shell, said first walls of said first shell enveloping said second walls of said second shell and defining a channel within said first shell, wherein said second shell reciprocates within said channel defined by said first walls of said first shell;
an image sensor arranged in said first shell;
a mirror set arranged in said second shell and guiding a reflected light from a document to be scanned to the image sensor in said first shell;
a lens set placed between the image sensor and the mirror set and focusing the reflected light to the image sensor;
wherein the second shell has a length larger than that of the first shell, and wherein said first shell telescopically moves outside and along said second walls of said second shell in said first and second scanning positions towards a respective inner wall of said outer casing a predetermined distance beyond a respective one of said front and rear portions of said second shell.

2. The carriage module as in claim 1, further comprising a light source positioned at a top of said first walls of said first shell.

3. The carriage module as in claim 1, wherein the image sensor is a charge coupled device (CCD).

4. The carriage module as in claim 1, wherein the mirror set comprises a plurality of reflection mirrors.

5. The carriage module as in claim 1, wherein the lens set comprises a lens.

6. The carriage module as in claim 1, wherein the lens set further comprises a focusing unit to refocus the reflected light.

7. The carriage module as in claim 1, wherein said outer casing has at least one stopper disposed on a respective inner wall of said outer casing.

8. The carriage module as in claim 7, wherein, when said front portion of said second shell abuts to said at least one stopper in said first scanning position of said case, said rear portion of said second shell projects through said second edge of said first shell.

9. The carriage module as in claim 7, wherein, when said rear portion of said second shell abuts to said at least one stopper in said second scanning position of said case, said front portion of said second shell projects through said first edge of said first shell.

* * * * *